US008316425B2

(12) United States Patent
Cattrone et al.

(10) Patent No.: US 8,316,425 B2
(45) Date of Patent: Nov. 20, 2012

(54) METHOD AND APPARATUS FOR AUTHENTICATING PRINTED DOCUMENTS

(75) Inventors: Paul Cattrone, Pleasant Hill, CA (US); Hiroshi Tomita, Palo Alto, CA (US); Vivek Pathak, Mountain View, CA (US)

(73) Assignee: Konica Monolta Laboratory U.S.A., Inc., San Mateo, CA (US)

( * ) Notice: Subject to any disclaimer, the term of this patent is extended or adjusted under 35 U.S.C. 154(b) by 1321 days.

(21) Appl. No.: 11/364,035

(22) Filed: Feb. 28, 2006

(65) Prior Publication Data

US 2007/0204164 A1 Aug. 30, 2007

(51) Int. Cl.
*G06F 21/00* (2006.01)
(52) U.S. Cl. .......................................................... 726/7
(58) Field of Classification Search .................. 713/176, 713/189, 179; 380/200–202
See application file for complete search history.

(56) References Cited

U.S. PATENT DOCUMENTS

| 5,113,445 | A | 5/1992 | Wang |
| 5,760,382 | A | 6/1998 | Li et al. |
| 7,080,041 | B2* | 7/2006 | Nagel ............................. 705/51 |
| 7,397,497 | B2* | 7/2008 | Murakami et al. ............ 348/173 |
| 2004/0052400 | A1 | 3/2004 | Inomata et al. |
| 2005/0219076 | A1* | 10/2005 | Harris .............................. 341/51 |
| 2005/0235163 | A1* | 10/2005 | Forlenza et al. .............. 713/193 |
| 2006/0133652 | A1* | 6/2006 | Iwasaki ......................... 382/115 |
| 2007/0165261 | A1 | 7/2007 | Someya |
| 2008/0005154 | A1* | 1/2008 | Fujimaki ....................... 707/102 |

FOREIGN PATENT DOCUMENTS

| JP | 2004-343523 | 12/2001 |
| JP | 2004-109172 A | 4/2004 |

OTHER PUBLICATIONS

14492FCD, Information Technology—Coded Representation of Picture and Audio Information—Lossy/Lossless Coding of Bi-Level Images, JBIG committee, Jul. 16, 1999 §0.1.6, p. 14.
Japanese Office Action, dated May 29, 2012 in a counterpart Japanese patent application, No. 2007-046716.

* cited by examiner

*Primary Examiner* — Brandon Hoffman
*Assistant Examiner* — Anthony Brown
(74) *Attorney, Agent, or Firm* — Chen Yoshimura LLP

(57) ABSTRACT

A method of authenticating a document, typically a printed document, is disclosed. The method comprises: (a) processing a first area of a source document according to a first authentication level to generate first authentication data; (b) processing a second area of the source document according to a second authentication level to generate second authentication data, the second authentication level being different from the first authentication level; (c) generating barcode data representing at least the first and second authentication data; and (d) carrying out at least one of: (d1) embedding the barcode data to the source document to generate a processed document; and (d2) printing the barcode data on a recording medium.

16 Claims, 2 Drawing Sheets

METHOD AND APPARATUS FOR AUTHENTICATING PRINTED DOCUMENTS

BACKGROUND OF THE INVENTION

1. Field of the Invention

This invention relates to document management, and in particular, it relates to the application of machine readable symbology for recording data, such as two-dimensional barcode in document authentication.

2. Description of the Related Art

Barcode is a form of machine-readable symbology for encoding data, and has been widely introduced in a variety of application fields. Two-dimensional barcode (2d barcode) is one mode of such symbology, and can be used to encode text, numbers, images, and binary data streams in general, and has been used in identification cards, shipping labels, certificates and other documents, etc. One widely used 2d barcode standard is the PDF417 standard, and software and hardware products have been available to print and read such 2d barcode. Color barcode has also been proposed.

SUMMARY OF THE INVENTION

The present invention is directed to a method and apparatus using 2d barcode or other forms of machine-readable symbology to authenticate a printed document.

An object of the present invention is to provide a method of efficiently generating authentication data to be printed on the document as 2d barcode.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other purpose and/or advantages, according to one embodiment reflecting an aspect of the present invention, a method for authenticating a document includes: (a) processing a first area of a source document according to a first authentication level to generate first authentication data; (b) processing a second area of the source document according to a second authentication level to generate second authentication data, the second authentication level being different from the first authentication level; (c) generating barcode data representing at least the first and second authentication data; and (d) carrying out at least one of: embedding the barcode data in the source document to generate a processed document, and printing the barcode data on a recording medium.

In another aspect, another embodiment of the present invention provides a method of authenticating a printed document, the printed document including barcode containing first authentication data corresponding to a first area of the document and second authentication data corresponding to a second area of the document, which includes: (a) scanning the printed document to obtain scanned data; (b) detecting barcode data in the scanned data; (c) obtaining from the barcode data the first and second authentication data corresponding to the first and second areas of the document; (d) comparing the first authentication data to the scanned data in the first area according to a first authentication level to determine whether the first area of the printed document is authentic; and (e) comparing the second authentication data to the scanned data in the second area according to a second authentication level to determine whether the second area of the printed document is authentic.

The present invention is also directed to computer program products that cause a data processing apparatus to perform the above methods.

In yet another aspect, an embodiment of the present invention provides a data processing apparatus which includes: a scanning section for scanning a hard copy document to generate a source document; a printing section for printing a document; a user interface section including a display device for displaying a source document and an input device for selecting one or more areas of the displayed document and assigning an authentication level to each area of the document; and a control section for controlling the data processing apparatus, the control section processing each area of the source document according to the authentication level for the area to generate authentication data and generating barcode data representing the authentication data.

It is to be understood that both the foregoing general description and the following detailed description are exemplary and explanatory and are intended to provide further explanation of the invention as claimed.

DETAILED DESCRIPTION OF THE PREFERRED EMBODIMENTS

Figure 1:
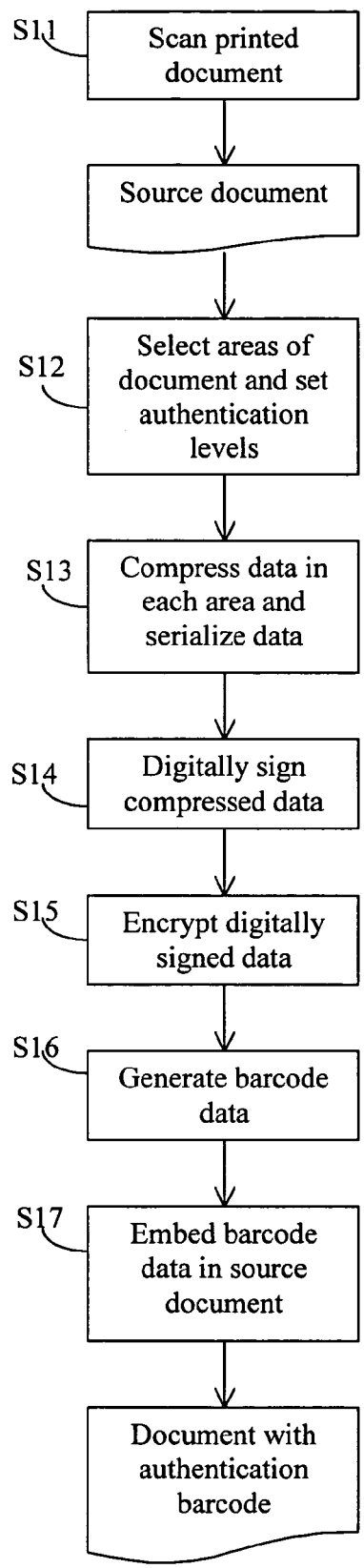
FIG. 1 is a flow chart showing a method of generating authentication data according to embodiments of the present invention.

Methods have been proposed to authenticate a printed document, i.e., to determine whether a copy of the document has been altered since it was originally printed. Such alterations may occur, for example, when a portion of the printed document is masked and different information printed over the masked portion in a deliberate attempt to alter the content of the printed document. Alterations may also occur inadvertently when the document is copied. The ability to authenticate a printed document is important in many situations. One proposed document authentication method includes encoding the content of the document in a 2d barcode (the authentication barcode) and printing the barcode on the same recording medium as the printed document. The content of the document may be a bitmap image of a page of the document, text or graphics contained within the document, a mixture of text and image, etc. To authenticate a printed document bearing an authentication barcode, the document is scanned to obtain scanned data that represents the content of the document (e.g. a bitmap image, or text extracted by using an optical character recognition (OCR) technology). The authentication barcode is also scanned and the data contained therein (the authentication data) is extracted. The scanned data is then compared to the authentication data to determine if any part of the printed document has been altered since it was originally printed (i.e. whether the document is authentic) and what the alterations are. A printed document bearing authentication barcode is said to be self-authenticating because no information other than what is on the printed document is required to authenticate its content. In one proposed method, 2d barcode representing encoded bitmap image of the document is printed on the backside of the recording medium on which the document is printed.

A bitmap image of a page of printed document often contains a large amount of data, and an authentication barcode that encode the entire image data often needs a large area to print even if the image data has been compressed. However, it is often the case that not all areas of the printed document contain important information that requires authentication under a strict standard. For example, in many practical applications, a document is based on a known template where only a fixed number of areas contain document-specific information (i.e. information unique to that document). Examples include forms, form documents, checks, etc. For such a document, a high level of authentication is often only necessary for the areas that contain document-specific information (e.g. form entries), and a low level of authentication may suffice for less important areas that only contain non-document-specific information. Accordingly, the following embodiments are directed to a variable level authentication method that applies different levels of authentication to different areas or portions of a document. Since higher levels of authentication generally require more authentication data to be stored in the authentication barcode, a variable level authentication method according to the following embodiments reduce the amount of data that must be stored in the authentication barcode.

Different levels of authentication may be accomplished in a number of ways. For example, when the document is a bitmap image, the authentication data may represent the original document image at its native resolution, or it may represent an image (the authentication image) that is a lower quality version of the original document image. The lower quality of the authentication image may be the result of reduced spatial resolution and/or bit depth as compared to the original image, or the result of compressing the original image using a lossy compression method with a relatively high compression ratio. Such an authentication image is generated from the original document image but contains less than all the information in the original image and hence smaller amount of data to be stored in the authentication barcode. The quality of the authentication image will depend on spatial resolution, bit depth, compression ratio, and other parameters used when generating the authentication image. When the scanned document is compared to a low quality authentication image to authenticate the document, certain alterations in the document will not be detected because the authentication image will have insufficient details to reveal these alterations. As a result, a copy that may differ from the original document image in certain details will still be deemed authentic using the low quality authentication image. This can be considered a lower level of authentication. Such lower level of authentication may nevertheless be useful, especially when applied to portions of the document that are less important. Thus, different levels of authentication can be achieved by varying the image quality (as indicated by the spatial resolution, bit depth, compression ratio, etc.) of the authentication image.

In one example, a low quality authentication image is generated by scaling down the image resolution using a bicubic sampling algorithm from its native resolution to a lower resolution, such as 200 dpi or less, and then compressed. This low quality authentication image can be used to verify pixel blocks of the original image having a size equivalent to (native X resolution/scaled X resolution) pixels by (native Y resolution/scaled Y resolution) pixels. Thus, if the native resolution is 600 dpi and the image is scaled down to 200 dpi, the low quality image can be verified as authentic within a 3×3 pixel bock accuracy.

In addition, a weak form of authentication may be used as a lower level of authentication. According to this algorithm, computations are performed on the document content (such as text or bitmap pixel values), and the result of the computation (the authentication data) is encoded in an authentication barcode. To authenticate a printed document, the document is scanned to obtain scanned data that represents the document content (text, bitmap image, etc.), and the same computations are performed on the scanned data. The result of the computation is then compared to the authentication data extracted from the authentication barcode. Such a comparison will indicate whether the document has been altered since it was originally printed (i.e. whether it is authentic), but will typically not indicate what the alterations are. This weak form of authentication is a lower level of authentication.

As used in this disclosure, different authentication levels mean that different algorithms or different parameters for an algorithm are used to process the original document data to generate the authentication data. The authentication level generally determines how much the document can be altered and still be deemed to be authentic.

According to an embodiment of the present invention, a document is divided into different areas and an authentication level is assigned to each area. Authentication data is generated for each area according to the authentication level, and the authentication data for the various areas are combined and encoded in a barcode. Location and authentication level information which specifies the location of the various areas and their authentication levels is also encoded in the barcode. The barcode, which is a typical example of a machine-readable symbology, is printed on the same recording medium or embedded in the electronic version of the document so that it can be saved for later or future printing. Therefore, on the recording medium, the contents of the document and the barcode data are both represented. The barcode data may be visually represented, or may at least be machine-readably represented even if this barcode is hardly recognizable for human naked eyes. The barcode data may be arranged on a blank area of the printed document, a marginal area of the document, or a backside of the recording medium on the front side of which the contents of the document is printed. Alternatively, the barcode data may be superimposed to the content of the document in integral fashion so as to be hardly recognizable to human. To authenticate a printed document bearing such a barcode, the authentication data in the barcode is extracted, and the various areas of the document and the corresponding authentication levels are identified. Each area of the scanned document is compared to the corresponding authentication data for that area according to its authentication level to determine if that area of the document is authentic and to determine if the entire document is authentic.

FIG. 1 is a flowchart showing a method of printing a document with authentication barcode according to the present embodiment. The method may be implemented, preferably by software or firmware, in a data processing apparatus such as a computer, scanner, copier, printer, or a printer/scanner/copier multi-function machine, etc. First, if the document to be processed is a printed document (a hard copy), it is scanned and converted into an electronic form (step S11). This step is omitted if the document to be processed is already in an electronic form. Hereinafter, the electronic form of the document to be processed is referred to as a source document. The source document may be in a variety of digital formats, including text, graphics, image, etc. and combinations of the above. One or more areas of the source document are then selected and an authentication level is set for each area (step S12). The authentication level may be set by specifying what algorithm is to be applied to process the original data, and/or the parameters used to process the original data, such as resolution, bit depth, compression ratio, etc. Alternatively, certain pre-defined authentication levels, such as "high", "medium" and "low", may be defined each corresponding to a specific algorithm and parameters. The authentication level for an area can then be set to one of the pre-defined levels. A default authentication level may be defined so that the area of the document not specifically selected (the default area) is set to the default authentication level.

The area selection and authentication level setting may be done manually, in which case the document is displayed on a display device (e.g. a computer monitor, a screen of a scanner or printer device, etc.), and the user uses an input device (e.g. a mouse, touch screen, etc.) to select one or more areas and set their authentication levels. The area selection may also be done automatically by the data processing apparatus, especially in the case where the source document is of a known format (e.g. a form) with pre-determined areas to be assigned a high authentication level. As another alternative, the data processing apparatus may allow the user to select the areas and assigned authentication levels using a displayed document, and store the selections and settings to be used for processing subsequent documents that have the same layout.

In one example, two authentication levels are used, with the user-selected areas assigned a "high" authentication level and the remainder of the document assigned a "low" authentication level. In such a case, the user only needs to select the important areas and the data processing apparatus will automatically set the selected areas to a high authentication level and the rest of the document a low authentication level. The higher authentication level preferably uses the native resolution of the original document image, while the lower authentication level may be either a fixed level or a dynamically determined level. For example, the resolution, compression ratio, etc. of the low level may be dynamically determined depending on the amount of authentication date for the high level areas, so that the total amount of authentication data for the entire document is within a given size.

A selected area may be defined by its coordinates on the printed or displayed document, such as in the case where the document is an image, or defined (e.g. by using metadata) as being associated with certain contents of the document even though its actual location on the printed or displayed page may vary, such as in the case of an image, field of data, etc. that are embedded in a text document. In this disclosure, an "area" or "portion" of a document broadly refers to either a physical portion of the document, or a portion of the content of the document regardless of its physical location on the printed document.

The data processing apparatus compresses each area of the source document (including the default area) according to the authentication level set for each area, and serialize the compressed data (i.e. combine the compressed data from different areas into one stream of compressed data) (step S13). (Alternatively, if the weak form of authentication described earlier is applied to one or more selected areas as a low level authentication algorithm, step S13 will include a step of performing computations on the document content in these areas, rather than compressing the data.) The data is then digitally signed (step S14, optional) and encrypted (step S15, optional), and barcode data is generated from the encrypted data (step S16). The barcode data is embedded in the source document (step S17) to generate a processed document in an electronic form. The processed document can then be printed, displayed, stored, and/or transmitted to another device. Alternatively, instead of embedding the barcode data in the document electronically, the barcode can be printed directed on the recording medium. Note that the digital signature (S14) and encryption (S15) steps are optional, depending on the level of security desired. In step S16, the barcode data is generated using any suitable barcode generating method and pursuant to any suitable standard, either currently existing or developed in the future.

The barcode data generated in step S16 contains location information that specifies the location of each selected area and authentication level information for each area. The location and authentication level information may be specified implicitly rather than explicitly. For example, a default may be set so that the area of the document not specifically selected is assigned a default authentication level, which is pre-stored in both the encoding and decoding apparatus. In the example described earlier where only two authentication levels are used, it is possible to only specify the locations of the selected areas, and to pre-store the two authentication levels in the encoding apparatus and the decoding apparatus. Because the document may contain additional barcode other than the authentication barcode, the authentication barcode may contain a pre-defined pattern to signify that it is an authentication barcode.

As used in this disclosure, the term "barcode" refers to 1d or 2d barcode, color barcode, or more generally, any machine-readable symbology that contains information. The term "barcode" typically refers to the machine-readable symbology in printed or displayed form, while the term "barcode data" typically refers to data in electronic form that, when printed or displayed, depicts a machine-readable symbology.

Figure 2:
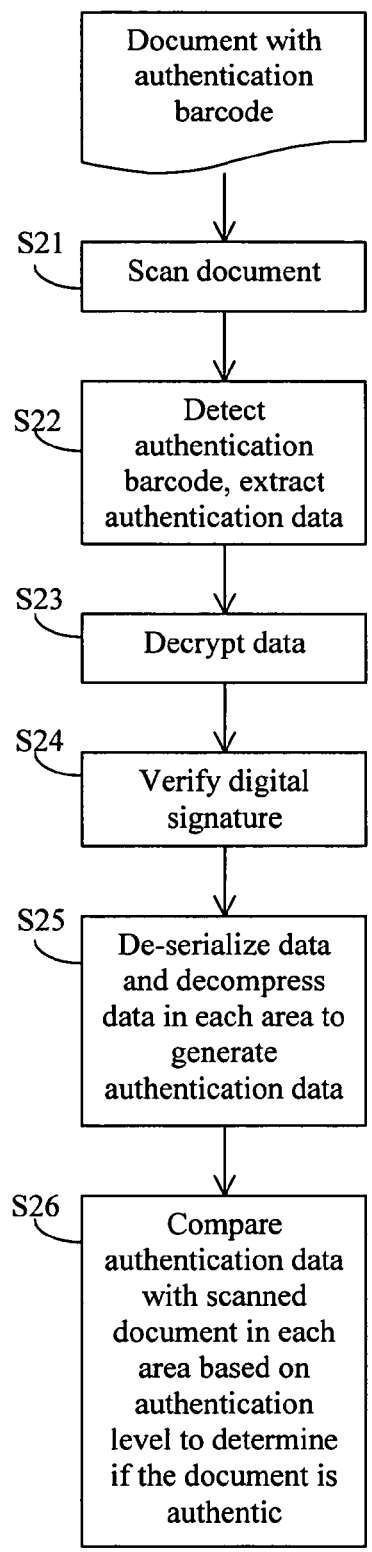
FIG. 2 is a flow chart showing a method of authenticating a document according to embodiments of the present invention.

A document authentication process according to the present embodiment is illustrated in FIG. 2. The method may be implemented, preferably by software or firmware, in a data processing apparatus such as a computer, scanner, copier, printer, or a printer/scanner/copier multi-function machine, etc. First, a document bearing authentication barcode is scanned (step S21), and the authentication barcode in the scanned document is detected and the authentication data contained therein is extracted (step S22). The scanning step (S21) may be omitted if the document is already in an electronic form. The extracted authentication data is decrypted (if the data has been encrypted) (step S23), and the digital signature (if present) is verified (step S24). The data is de-serialized to obtain authentication data for each area, and the data for each area is decompressed (step S25). (Alternatively, if the weak form of authentication has been applied to one or more areas, no decompression will be performed for these areas.) The authentication data for each area is then compared to the corresponding area of the scanned document based on the level of authentication set for that area to determine if that area is authentic (step S26). Depending on the authentication levels, different comparison algorithms or tolerance thresholds are used. (For example, for the areas where the weak form of authentication has been applied, the comparing step S26 will include performing computations on the scanned document data in the corresponding areas and comparing the computation result with the authentication data.) The scanned document in each area will be deemed authentic if a measure of difference between the authentication data and the scanned document is below a threshold value. The threshold values will be dependent on the authentication level; areas with lower authentication levels generally are given higher threshold values so they may be deemed authentic even if relatively large differences are present between the authentication data and the scanned document. The tolerance threshold may be set by the user when setting the authentication level, or (preferably) automatically determined by the data processing apparatus based on the resolution, compression ratio, etc. of the authentication level setting. The scanned document is deemed authentic if all areas of the document are deemed authentic.

In the embodiments described above, the compressed data is serialized into one data stream to generate one authentication barcode. The barcode may be formed of more than one barcode stamps depending on the amount of data contained therein (a barcode stamp is a barcode printed in a discrete area, usually rectangular, surrounded by non-printed margins). Alternatively, the data in different selected areas of the document can also be encoded into separate barcodes.

Figure 3:
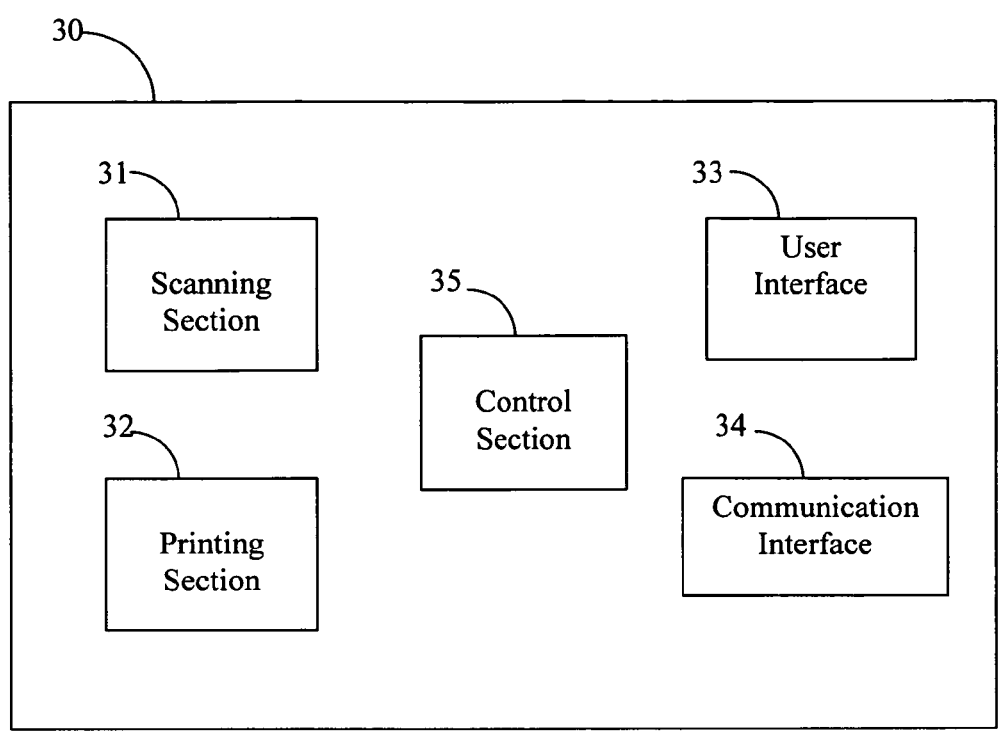
FIG. 3 schematically illustrates a scanner/copier device according to an embodiment of the present invention.

One practical application of the variable level authentication method is a copier device that can make a copy of an original printed document that did not have authentication barcode and add the authentication barcode. As shown in FIG. 3, such a copier device 30 includes a scanning section 31 for scanning a hard copy document to obtain digital data representing the document, a printing section 32 for printing a document, a user interface section 33 for interacting with the user, a communication interface section 34 for communicating with an external device through, for instance, a network, and a control section 35 for controlling the functions of the copier device. In a case where such a copier has at least two functions including scanner function, printer function, copier function, facsimile function, and so on, this copier is sometimes referred to as a multifunction machine. The control section 35 contains a processor with associated memory and control software. The user interface section 33 includes at least a control panel for inputting user commands. It may also include a display panel for displaying an image of the scanned document, and an input device such as a mouse or touch screen to allow the user to make a selection of the areas and assign authentication levels. Such a display panel and input device are required if the copier is to function in a standalone configuration. If the copier 30 is connected to an external computer, then the display and input device of the computer can be used to display the scanned image and allow the user to select the areas and assign authentication levels. The data processing program for processing the data in the selected areas (compression, digital signature, encryption, barcode generation, etc.) may reside in the copier, or in the external computer connected thereto. In operation, the scanning section 31 scans the original hard copy, and an image of the document is displayed on a display, which is either a part of the copier or a part of the connected computer. The user selects one or more areas and assigns the authentication levels using an input device, which is either a part of the scanner/copier or a part of the connected computer. Alternatively, the program may automatically select the areas and assigns authentication levels as described earlier. The data processing program processes the document using the method described earlier (e.g., FIG. 1, steps S13-S16) to generate authentication barcode data. The copier then prints a hard copy of the original document along with the authentication barcode on the same recording medium. Alternatively, the copier may print the authentication barcode on the original document itself, such as on the back side of the document or in a margin area of the document. Another practical application of the variable level authentication method is a scanner, which is generally similar to the copier described above except that instead of making a hard copy with added authentication barcode, the scanner generates an electronic copy of the document with the authentication barcode embedded therein.

Another practical application of the variable level authentication method is a software program that allows a user to print a document along with authentication barcode on a recording medium. The document to be printed (the source document) may originate from any suitable source, including word processing applications, spreadsheet applications, graphics applications, email applications, web browser applications, scanners, digital cameras, etc. When the user prints an electronic document from a computer using such a program, the program displays an image of the document on the computer screen, and allows the user to select areas of the document and assigns authentication levels to each area. Alternatively, the program may automatically select the areas and assign authentication levels as described earlier. The program processes the areas of the document according to the authentication level to generate authentication barcode data, and causes the document to be printed along with the authentication barcode on the recording medium. Alternatively, in lieu of printing the document on a recording medium, the software program may store a processed document in electronic form which, when printed later, will include authentication barcode.

Another practical application of the variable level authentication method is a scanner or document reader that can scan a printed document bearing authentication barcode and determine its authenticity. The hardware configuration of the scanner or reader is similar to that shown in FIG. 3 except that a printing section is not necessary. In operation, the scanning section 31 scans the document including the barcode, and the data processing program processes the document using the method described earlier (e.g., FIG. 2, steps S2-S26) to determine whether the document is authentic.

The variable level authentication method can be embodied in a scanner or copier in a stand-alone configuration. The variable level authentication method can also be embodied in a control program that causes a scanner or copier to produce a hard copy or electronic copy of an original document as described above.

From the above descriptions, it can be seen that a feature of embodiments of the present invention is to use different authentication levels for different portions of a document when generating authentication barcode. By storing high tolerance portion in highly compressed form, for example, the amount of data needed to be stored in the barcode can be greatly reduced.

In the above descriptions, the term "source document" and "processed document" are used to refer to electronic forms of a document, i.e., electronic signals representing a document. It should be understood that the electronic form of a document may only exist transiently, and electronic signals representing different parts of the document may not exist simultaneously. Such variations are encompassed within the scope of the present invention.

It will be apparent to those skilled in the art that various modification and variations can be made in the selective image encoding and replacement method and apparatus of the present invention without departing from the spirit or scope of the invention. Thus, it is intended that the present invention cover modifications and variations that come within the scope of the appended claims and their equivalents.

What is claimed is:

1. A method implemented in a data processing apparatus for authenticating a document, comprising:
   (a) processing a first area of a source document according to a first authentication level to generate first authentication data which represents an image of the first area at a first spatial resolution or first bit depth or first image compression ratio;

(b) processing a second area of the source document according to a second authentication level to generate second authentication data which represents an image of the second area at a second spatial resolution or second bit depth or second image compression ratio, the second area being different from the first area, the second authentication level being different from the first authentication level, wherein the second spatial resolution or second bit depth or second image compression ratio is different from the first spatial resolution or first bit depth or first image compression ratio, respectively, and wherein the second authentication data generated for the second area according to the second authentication level has a smaller data amount than if the authentication data had been generated for the second area according to the first authentication level; (c) generating barcode data representing at least the first and second authentication data; and (d) carrying out at least one of: embedding the barcode data in the source document to generate a processed document, and printing the barcode data on a recording medium.

2. The method of claim 1, wherein the barcode data generated in step (c) contains location information for at least one of the first area and second area.

3. The method of claim 1, wherein the barcode data generated in step (c) contains authentication level information for at least one of the first area and second area.

4. The method of claim 1, further including:
(e) selecting the first area and the second area prior to step (a).

5. The method of claim 4, wherein step (e) comprises:
displaying the source document on a display device; and
selecting one or more areas of the displayed document by a user.

6. The method of claim 4, wherein step (e) comprises automatically selecting one or more areas of the document.

7. The method of claim 1, wherein step (a) comprises:
(a1) compressing the first area of the source document at a first compression ratio, and wherein step (b) comprises:
(b1) compressing the second area of the source document at a second compression ratio different from the first compression ratio.

8. The method of claim 7, wherein step (a) further comprises:
(a2) digitally signing the compressed data; and
(a3) encrypting the digitally signed data; and
wherein step (b) further comprises:
(b2) digitally signing the compressed data; and
(b3) encrypting the digitally signed data.

9. The method of claim 1, wherein step (a) comprises compressing the first area of the source document, and
wherein step (b) comprises performing a computation on the second area of the source document.

10. A method implemented in a data processing apparatus for authenticating a printed document, the printed document including barcode containing first authentication data corresponding to a first area of the document which has been generated according to a first authentication level and which represents an image of the first area at a first spatial resolution or first bit depth or first image compression ratio, and second authentication data corresponding to a second area of the document different from the first area which has been generated according to a second authentication level and which represents an image of the second area at a second spatial resolution or second bit depth or second image compression ratio, the method comprising: (a) scanning the printed document to obtain scanned data; (b) detecting barcode data in the scanned data; (c) obtaining from the barcode data the first and second authentication data corresponding to the first and second areas of the document; (d) comparing the first authentication data to the scanned data in the first area by image comparison according to the first authentication level at the first spatial resolution or first bit depth or first image compression ratio to determine whether the first area of the printed document is authentic; and (e) comparing the second authentication data to the scanned data in the second area by image comparison according to the second authentication level at the second spatial resolution or second bit depth or second image compression ratio to determine whether the second area of the printed document is authentic, wherein the second spatial resolution or second bit depth or second image compression ratio is different from the first spatial resolution or first bit depth or first image compression ratio, respectively, and wherein the second authentication data corresponding to the second area which has been generated according to the second authentication level has a smaller data amount than if the authentication data had been generated for the second area according to the first authentication level.

11. The method of claim 10, wherein the barcode data has been encrypted and digitally signed, wherein step (c) comprises:
(c1) decrypting the barcode data; and
(c2) verifying a digital signature in the barcode data.

12. The method of claim 10, wherein the first and second authentication data respectively represent compressed image of the first and second areas of an original document, wherein step (d) comprises:
(d1) decompressing the first authentication data; and
(d2) determining whether a measure of difference between the decompressed data and the scanned data in the first area is below a first threshold value; and
wherein step (e) comprises:
(e1) decompressing the second authentication data; and
(e2) determining whether a measure of difference between the decompressed data and the scanned data in the second area is below a second threshold value.

13. The method of claim 10, wherein the first authentication data represents compressed image of the first area of an original document and the second authentication data represents a result of a computation performed on the second area of the original document, wherein step (d) comprises:
(d1) decompressing the first authentication data; and
(d2) determining whether a measure of difference between the decompressed data and the scanned data in the first area is below a first threshold value; and
wherein step (e) comprises:
(e1) performing the computation on scanned data in the second area; and
(e2) determining whether a measure of difference between the second authentication data and a result of the computation in step (e1) is below a second threshold value.

14. A computer program product comprising a computer readable storage medium having a computer readable code embodied therein for controlling a data processing apparatus, the computer readable program code configured to cause the data processing apparatus to execute a process for authenticating a document comprising the steps of: (a) processing a first area of a source document according to a first authentication level to generate first authentication data which represents an image of the first area at a first spatial resolution or first bit depth or first image compression ratio;

(b) processing a second area of the source document according to a second authentication level to generate second authentication data which represents an image of the second area at a second spatial resolution or second bit depth or second image compression ratio, the second area being different from the first area, the second authentication level being different from the first authentication level, wherein the second spatial resolution or second bit depth or second image compression ratio is different from the first spatial resolution or first bit depth or first image compression ratio, respectively, and wherein the second authentication data generated for the second area according to the second authentication level has a smaller data amount than if the authentication data had been generated for the second area according to the first authentication level;

(c) generating barcode data representing at least the first and second authentication data; and (d) carrying out at least one of: embedding the barcode data in the source document to generate a processed document, and printing the barcode data on a recording medium.

15. A computer program product comprising a computer readable storage medium having a computer readable code embodied therein for controlling a data processing apparatus, the computer readable program code configured to cause the data processing apparatus to execute a process for authenticating a printed document which includes barcode containing first authentication data corresponding to a first area of the document which has been generated according to a first authentication level and which represents an image of the first area at a first spatial resolution or first bit depth or first image compression ratio, and second authentication data corresponding to a second area of the document different from the first area which has been generated according to a second authentication level and which represents an image of the second area at a second spatial resolution or second bit depth or second image compression ratio, comprising: (a) scanning the printed document to obtain scanned data; (b) detecting barcode data in the scanned data; (c) obtaining from the barcode data the first and second authentication data corresponding to the first and second areas of the document; (d) comparing the first authentication data to the scanned data in the first area by image comparison according to the first authentication level at the first spatial resolution or first bit depth or first image compression ratio to determine whether the first area of the printed document is authentic; and (e) comparing the second authentication data to the scanned data in the second area by image comparison according to the second authentication level at the second spatial resolution or second bit depth or second image compression ratio to determine whether the second area of the printed document is authentic, wherein the second spatial resolution or second bit depth or second image compression ratio is different from the first spatial resolution or first bit depth or first image compression ratio, respectively, and wherein the second authentication data corresponding to the second area which has been generated according to the second authentication level has a smaller data amount than if the authentication data had been generated for the second area according to the first authentication level.

16. A data processing apparatus comprising: a scanning section for scanning a hard copy document to generate a source document; a printing section for printing a document; a user interface section including a display device for displaying a source document and an input device for selecting one or more areas of the displayed document and assigning an authentication level to each area of the document; and a control section for controlling the data processing apparatus, the control section processing each area of the source document according to the authentication level for the area to generate authentication data and generating barcode data representing the authentication data, wherein the control section processes at least a first area according to a first assigned authentication level to generate first authentication data which represents an image of the first area at a first spatial resolution or first bit depth or first image compression ratio, and processes at least a second area according to a second assigned authentication level different from the first authentication level to generate second authentication data which represents an image of the second area at a second spatial resolution or second bit depth or second image compression ratio, the second area being different from the first area, wherein the second spatial resolution or second bit depth or second image compression ratio is different from the first spatial resolution or first bit depth or first image compression ratio, respectively, and wherein the second authentication data generated for the second area according to the second authentication level has a smaller data amount than if the authentication data had been generated for the second area according to the first authentication level.

* * * * *